US 8,140,889 B2

(12) United States Patent
Budnik et al.

(10) Patent No.: US 8,140,889 B2
(45) Date of Patent: Mar. 20, 2012

(54) DYNAMICALLY REASSIGNING A CONNECTED NODE TO A BLOCK OF COMPUTE NODES FOR RE-LAUNCHING A FAILED JOB

(75) Inventors: Thomas A. Budnik, Rochester, MN (US); Brant L. Knudson, Rochester, MN (US); Mark G. Megerian, Rochester, MN (US); Samuel J. Miller, Rochester, MN (US); William M. Stockdell, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/861,426

(22) Filed: Aug. 23, 2010

(65) Prior Publication Data
US 2012/0047393 A1 Feb. 23, 2012

(51) Int. Cl.
*G06F 11/00* (2006.01)

(52) U.S. Cl. .......... 714/4.11; 714/4.12; 714/11; 714/13

(58) Field of Classification Search .................. None
See application file for complete search history.

(56) References Cited

U.S. PATENT DOCUMENTS

| | | | | |
|---|---|---|---|---|
| 6,000,024 | A * | 12/1999 | Maddox ..................... | 712/11 |
| 6,957,318 | B2 * | 10/2005 | Emberson et al. ............. | 712/11 |
| 7,512,836 | B2 * | 3/2009 | Darrington et al. ............ | 714/13 |
| 2008/0263386 | A1 * | 10/2008 | Darrington et al. ............ | 714/4 |

* cited by examiner

*Primary Examiner* — Michael Maskulinski
(74) *Attorney, Agent, or Firm* — Biggers & Ohanian, LLP

(57) ABSTRACT

Methods, systems, and products for dynamically reassigning a connected node to a block of compute nodes for re-launching a failed job that include: identifying that a job failed to execute on the block of compute nodes because connectivity failed between a compute node assigned as at least one of the connected nodes for the block of compute nodes and its supporting I/O node; and re-launching the job, including selecting an alternative connected node that is actively coupled for data communications with an active I/O node; and assigning the alternative connected node as the connected node for the block of compute nodes running the re-launched job.

18 Claims, 8 Drawing Sheets

DYNAMICALLY REASSIGNING A CONNECTED NODE TO A BLOCK OF COMPUTE NODES FOR RE-LAUNCHING A FAILED JOB

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for dynamically reassigning a connected node to a block of compute nodes for re-launching a failed job.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point-to-point operations. In a tree network, the nodes typically are connected into a binary tree: each node has a parent, and two children (although some nodes may only have zero children or one child, depending on the hardware configuration). Although a tree network typically is inefficient in point-to-point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

Collective operations that involve data communications amongst many compute nodes may be carried out with a variety of algorithms. That is, the end result of a collective operation may be achieved in various ways. Some algorithms may provide better performance than other algorithms when operating in particular configurations. What is needed therefore is a way to optimize the selection of the best performing algorithm or set of algorithms to carry out collective operations in particular operating configurations.

SUMMARY OF THE INVENTION

Methods, apparatus, and products are disclosed for dynamically reassigning a connected node to a block of compute nodes for re-launching a failed job that include: identifying that a job failed to execute on the block of compute nodes because connectivity failed between a compute node assigned as at least one of the connected nodes for the block of compute nodes and its supporting I/O node; and re-launching the job, including: selecting an alternative connected node that is actively coupled for data communications with an active I/O node; and assigning the alternative connected node as the connected node for the block of compute nodes running the re-launched job.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
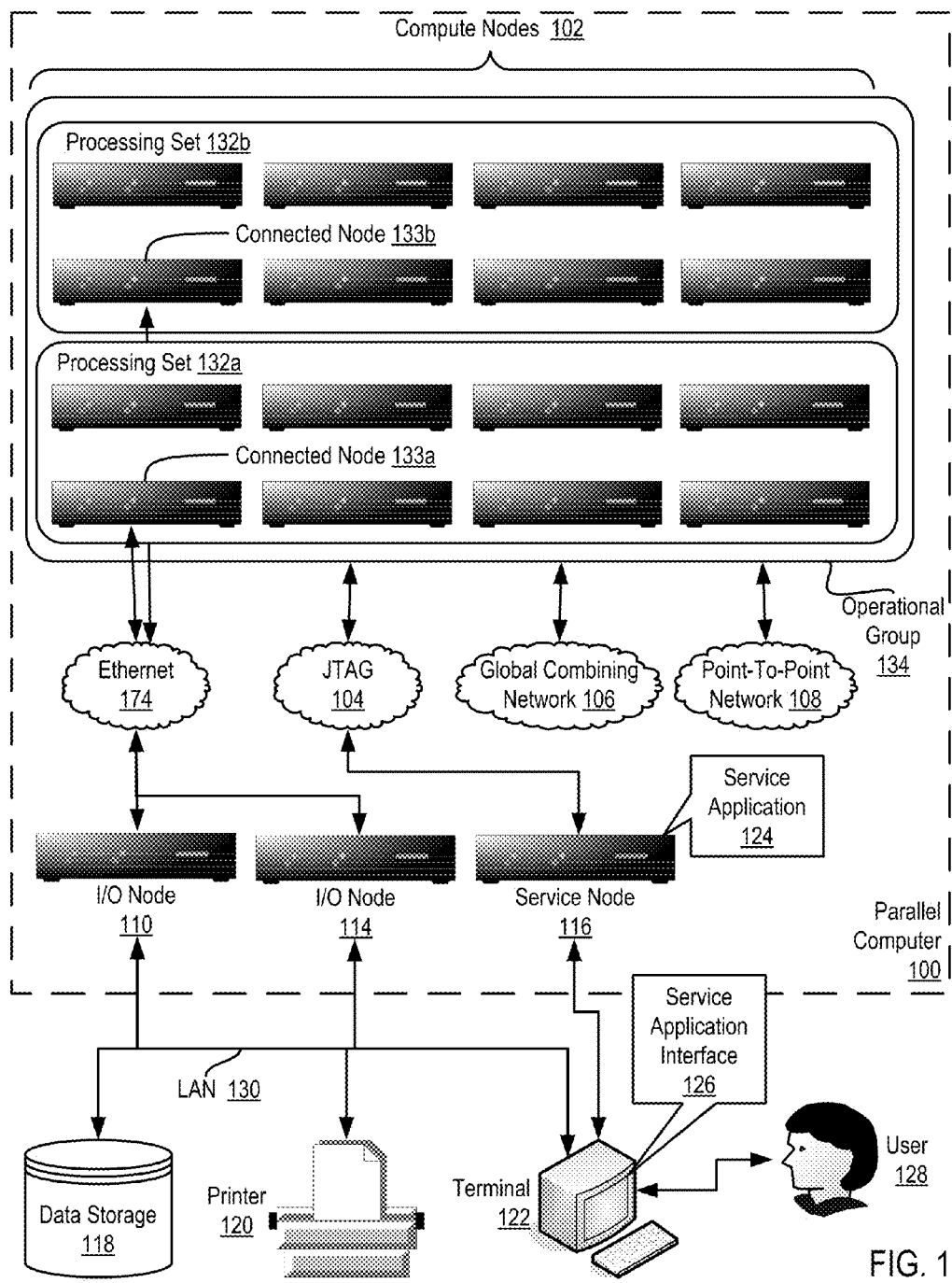
FIG. 1 sets forth an exemplary system for dynamically reassigning a connected node to a block of compute nodes for re-launching a failed job according to embodiments of the present invention.

Exemplary methods, apparatus, and products for dynamically reassigning a connected node to a block of compute nodes for re-launching a failed job in accordance with the present invention are described with reference to the accompanying drawings, beginning with FIG. 1. FIG. 1 sets forth an exemplary system for dynamically reassigning a connected node to a block of compute nodes for re-launching a failed job according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122). The parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

In addition, the compute nodes (102) of the parallel computer (100) are organized into at least one operational group (134) of compute nodes for collective parallel operations on the parallel computer (100). Each operational group (134) of compute nodes is the set of compute nodes upon which a collective parallel operation executes. Each compute node in the operational group (134) is assigned a unique rank that identifies the particular compute node in the operational group (134). Collective operations are implemented with data communications among the compute nodes of a operational group. Collective operations are those functions that involve all the compute nodes of an operational group (134). A collective operation is an operation, a message-passing computer program instruction that is executed simultaneously, that is, at approximately the same time, by all the compute nodes in a operational group (134) of compute nodes. Such an operational group (134) may include all the compute nodes (102) in a parallel computer (100) or a subset all the compute nodes (102). Collective operations are often built around point-to-point operations. A collective operation requires that all processes on all compute nodes within an operational group (134) call the same collective operation with matching arguments. A 'broadcast' is an example of a collective operation for moving data among compute nodes of a operational group. A 'reduce' operation is an example of a collective operation that executes arithmetic or logical functions on data distributed among the compute nodes of a operational group (134). An operational group (134) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for performing an allreduce operation using shared memory according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (134). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (134). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) are partitioned into processing sets (132a, 132b) such that each compute node in a processing set (132a, 132b) is connected for data communications to the same I/O node (110, 114). Each processing set (132a, 132b), therefore, is composed of one I/O node (110, 114) and a subset of compute nodes (102). The ratio between the number of compute nodes (102) to the number of I/O nodes (110, 114) in the entire system typically depends on the hardware configuration for the parallel computer (100). For example, in some configurations, each processing set (132a, 132b) may be composed of eight compute nodes and one I/O node. In some other configurations, each processing set (132a, 132b) may be composed of sixty-four compute nodes and one I/O node. Such examples are for explanation only, however, and not for limitation. Each I/O node (110, 114) provides I/O services between compute nodes (102) of its processing set (132a, 132b) and a set of I/O devices. In the example of FIG. 1, the I/O nodes (110, 114) are connected for data communications to I/O devices (118, 120, 122) through local area network ('LAN') (130) implemented using high-speed Ethernet.

In the example of FIG. 1, each processing set (132a, 132b) includes at least one connected node (133a, 133b). Each connected node (133a, 133b) is a compute node that is coupled for data communications with an I/O node (110, 114). For example, a first connected node (133a) may be coupled to a first I/O node (110) via the Ethernet network (174) and a second connected node (133b) may be coupled to a second I/O node (114) via the Ethernet network (174). Because each connected node (133a, 133b) is also coupled, directly or indirectly, to every other compute node in the processing set (132a, 132b), each connected node (133a, 133b) may therefore route data communications between any compute node in an processing set (132a, 132b) and the I/O node (110, 114) that is coupled for data communications to the connected node (133a, 133b).

As described in more detail below in this specification, the system of FIG. 1 operates generally for dynamically reassigning a connected node (133a, 133b) to a block of compute nodes, such as an processing set (132a, 132b), for re-launching a failed job. Dynamically reassigning a connected node (133a, 133b) to a block of compute nodes for re-launching a failed job can include identifying that a job failed to execute on the block of compute nodes because connectivity failed between a compute node assigned as at least one of the connected nodes (133a, 133b) for the block of compute nodes and its supporting I/O node (110, 114) and re-launching the job. Re-launching the job can include selecting an alternative connected node (133a, 133b) that is actively coupled for data communications with an active I/O node (110, 114) and assigning the alternative connected node (133a, 133b) as the connected node (133a, 133b) for the block of compute nodes running the re-launched job.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The arrangement of nodes, networks, and I/O devices making up the exemplary system illustrated in FIG. 1 are for explanation only, not for limitation of the present invention. Data processing systems capable of dynamically reassigning a connected node to a block of compute nodes for re-launching a failed job according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of dynamically reassigning a connected node to a block of compute nodes for re-launching a failed job according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Dynamically reassigning a connected node to a block of compute nodes for re-launching a failed job according to embodiments of the present invention is generally implemented on a parallel computer that includes a plurality of compute nodes. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an exemplary compute node (152) useful in a parallel computer capable of dynamically reassigning a connected node to a block of compute nodes for re-launching a failed job according to embodiments of the present invention. The compute node (152) of FIG. 2 includes a plurality of processing cores (164) as well as random access memory ('RAM') (156). The processing cores (164) of FIG. 2 may be configured on one or more integrated circuit dies. Processing cores (164) are connected to RAM (156) through a high-speed memory bus (154) and through a bus adapter (194) and an extension bus (168) to other components of the compute node. Stored in RAM (156) is an application program (158), a module of computer program instructions that carries out parallel, user-level data processing using parallel algorithms.

Also stored RAM (156) is a parallel communications library (160), a library of computer program instructions that carry out parallel communications among compute nodes, including point-to-point operations as well as collective operations.

Application program (158) executes collective operations by calling software routines in parallel communications library (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
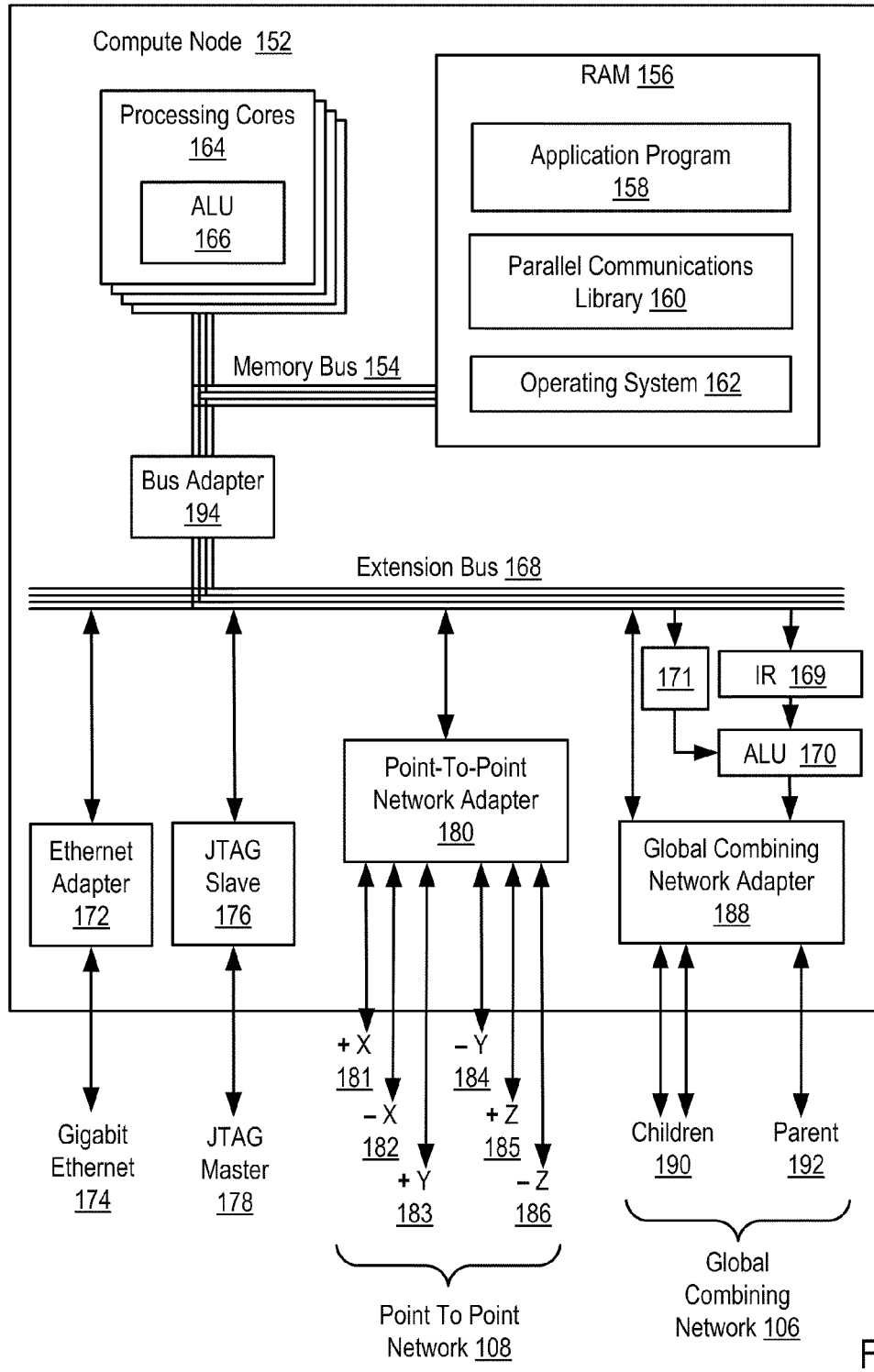
FIG. 2 sets forth a block diagram of an exemplary compute node useful in a parallel computer capable of dynamically reassigning a connected node to a block of compute nodes for re-launching a failed job according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems that dynamically reassign a connected node to a block of compute nodes for re-launching a failed job include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (152) for use in dynamically reassigning a connected node to a block of compute nodes for re-launching a failed job according to embodiments of the present invention.

The data communications adapters in the example of FIG. 2 include a Point-To-Point Network Adapter (180) that couples example compute node (152) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (152) for data communications to a network (106) that is optimal for collective message passing operations such as, for example, a network configured as a binary tree. The Global Combining Network Adapter (188) provides data communications through three bidirectional links: two to children nodes (190) and one to a parent node (192).

The example compute node (152) includes multiple arithmetic logic units ('ALUs'). Each processing core (164) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (160) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (164) or, typically much faster, by use of the dedicated ALU (170) using data provided by the nodes (190, 192) on the global combining network (106) and data provided by processing cores (164) on the compute node (152).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (162) on the compute node (152) contribute data that alters the output of ALU (170), which is then passed up or down the global combining network (106). Because the ALU (170) typically does not output any data onto the network (106) until the ALU (170) receives input from one of the processing cores (164), a processing core (164) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (152) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
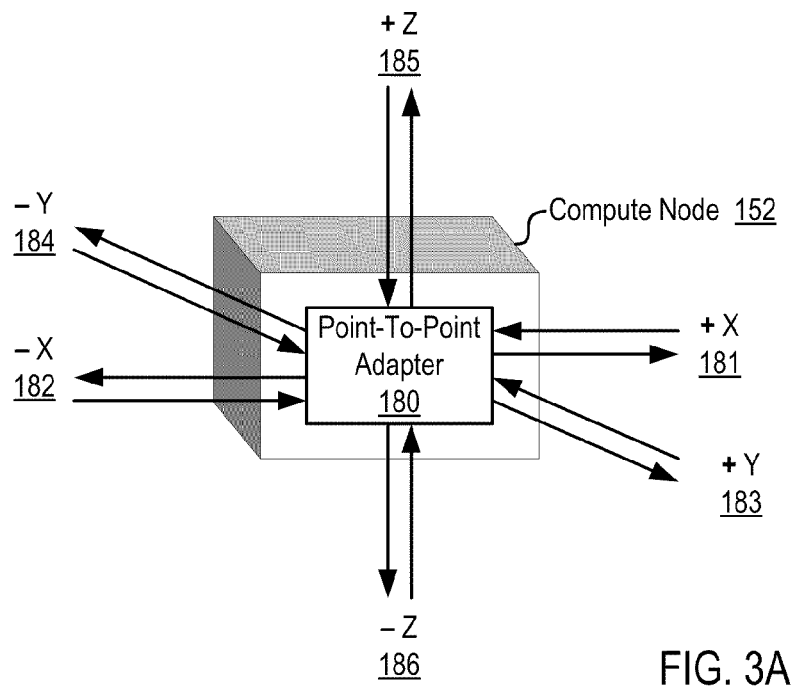
FIG. 3A sets forth a block diagram of an exemplary Point-To-Point Adapter useful in systems that dynamically reassign a connected node to a block of compute nodes for re-launching a failed job according to embodiments of the present invention.

For further explanation, FIG. 3A sets forth a block diagram of an exemplary Point-To-Point Adapter (180) useful in systems that dynamically reassign a connected node to a block of compute nodes for re-launching a failed job according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
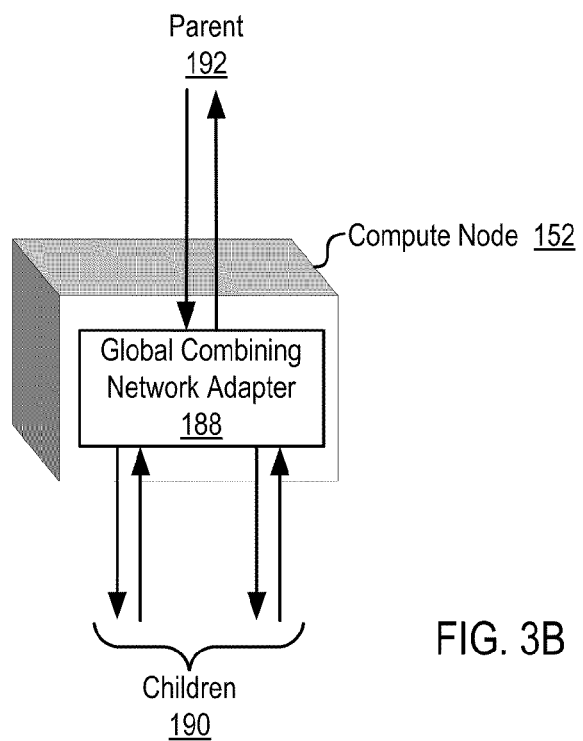
FIG. 3B sets forth a block diagram of an exemplary Global Combining Network Adapter useful in systems that dynamically reassign a connected node to a block of compute nodes for re-launching a failed job according to embodiments of the present invention.

For further explanation, FIG. 3B sets forth a block diagram of an exemplary Global Combining Network Adapter (188) useful in systems that dynamically reassign a connected node to a block of compute nodes for re-launching a failed job according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from two children nodes through four unidirectional data communications links (190). The Global Combining Network Adapter (188) also provides data communication to and from a parent node through two unidirectional data communications links (192).

Figure 4:
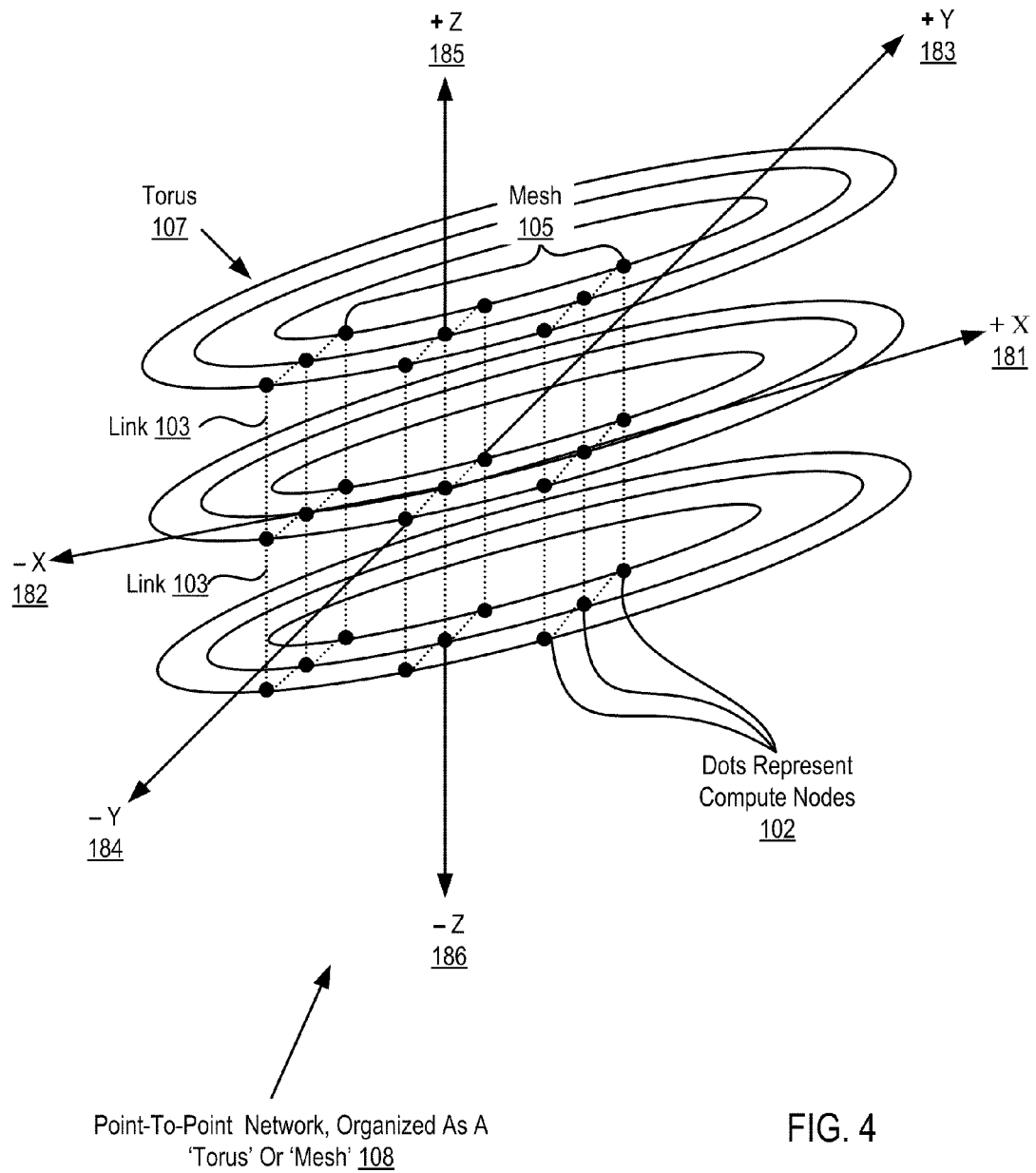
FIG. 4 sets forth a line drawing illustrating an exemplary data communications network optimized for point-to-point operations useful in systems that dynamically reassign a connected node to a block of compute nodes for re-launching a failed job according to embodiments of the present invention.

For further explanation, FIG. 4 sets forth a line drawing illustrating an exemplary data communications network (108) optimized for point-to-point operations useful in systems that dynamically reassign a connected node to a block of compute nodes for re-launching a failed job according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in dynamically reassigning a connected node to a block of compute nodes for re-launching a failed job in accordance with embodiments of the present invention may contain only a few compute nodes or may contain thousands of compute nodes.

Figure 5:
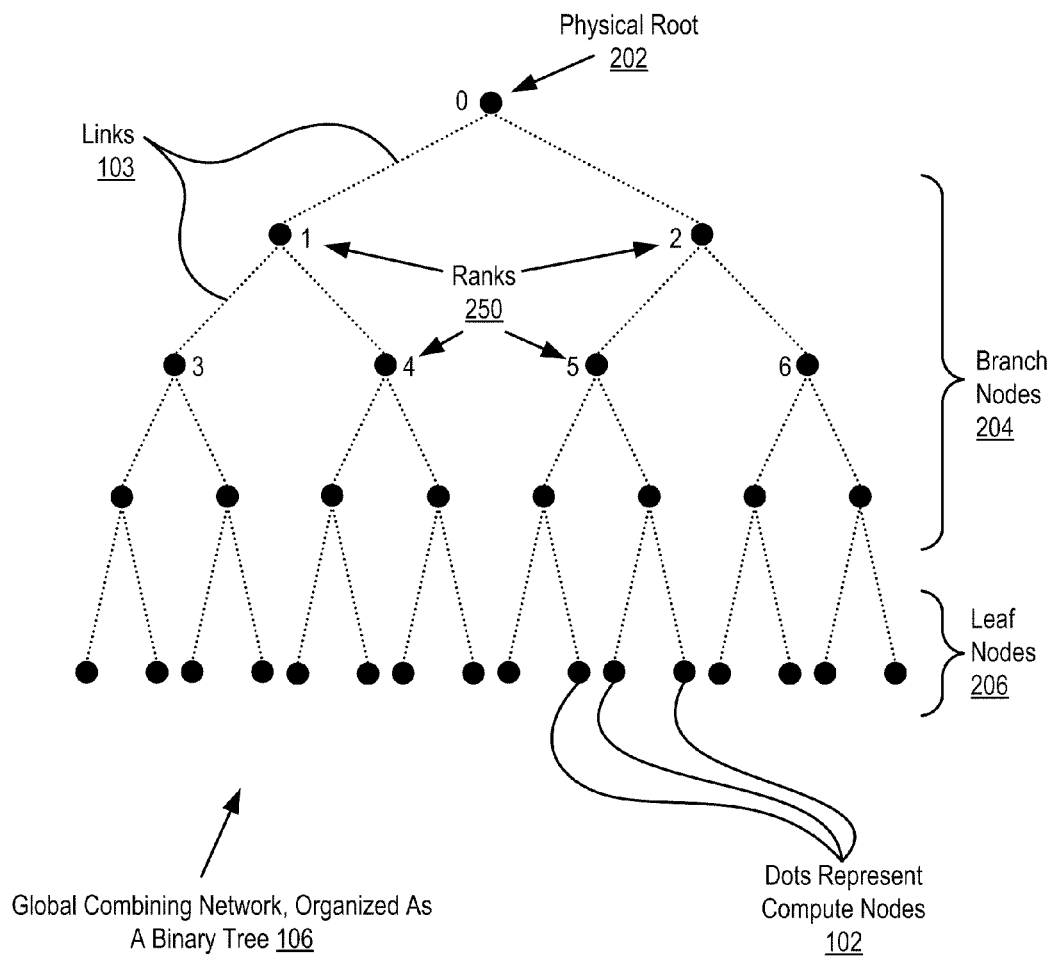
FIG. 5 sets forth a line drawing illustrating an exemplary global combining network useful in systems that dynamically reassign a connected node to a block of compute nodes for re-launching a failed job according to embodiments of the present invention.

For further explanation, FIG. 5 sets forth a line drawing illustrating an exemplary global combining network (106) useful in systems that dynamically reassign a connected node to a block of compute nodes for re-launching a failed job according to embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network optimized for collective operations for use in dynamically reassigning a connected node to a block of compute nodes for re-launching a failed job in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point-to-point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
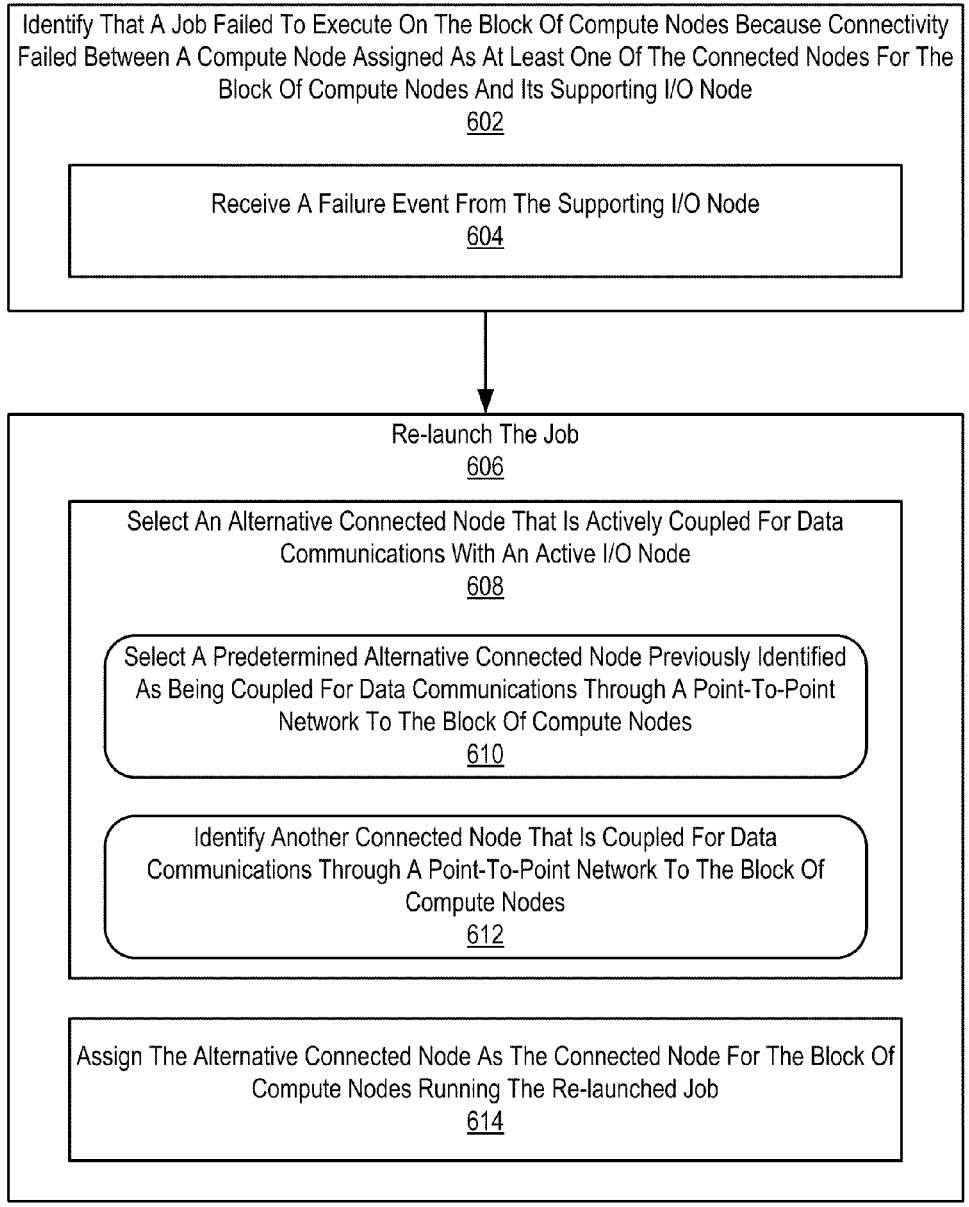
FIG. 6 sets forth a flow chart illustrating an exemplary method for dynamically reassigning a connected node to a block of compute nodes for re-launching a failed job according to embodiments of the present invention.

For further explanation, FIG. 6 sets forth a flow chart illustrating an exemplary method for dynamically reassigning a connected node to a block of compute nodes for re-launching a failed job according to embodiments of the present invention. The example of FIG. 6 includes identifying (602) that a job failed to execute on the block of compute nodes because connectivity failed between a compute node assigned as at least one of the connected nodes for the block of compute nodes and its supporting I/O node. In the example of FIG. 6, a job may be embodied as one or more computer program instructions that are to be executed on a particular compute node in the block of compute nodes. In the example of FIG. 6, a job fails when the computer program instructions that are to be executed on a particular compute node cannot be executed. In general a job may fail, for example, because the computer program instructions are malformed, because a processing unit on the target compute node is busy or otherwise unable to execute the computer program instructions, and for other reasons. In the example of FIG. 6, however, the job fails because connectivity failed between the target compute node and its supporting I/O node.

In the example of FIG. 6, connectivity failure between a compute node that is assigned as a connected node for the block of compute nodes and its supporting I/O node can cause a job to fail, for example, because the connectivity failure prevented the target compute node from receiving the job, because the connectivity failure prevented the target compute node from receiving input required to execute the job, because the connectivity failure prevented the target compute node from returning results associated with the completed execution of the job, because the connectivity failure caused the job to be corrupted, and so on. In the example of FIG. 6, a connectivity failure may occur, for example, because the supporting I/O node failed, because the target compute node failed, because an intervening node failed, because a communications path between the nodes failed, and so on.

In the example of FIG. 6, identifying (602) that a job failed to execute on the block of compute nodes because connectivity failed between a compute node assigned as at least one of the connected nodes for the block of compute nodes and its supporting I/O node may include receiving (604) a failure event from the supporting I/O node. In the example of FIG. 6, a failure event may be embodied as a message or other notification that includes information identifying, for example, the I/O node associated with the failure, the connected node associated with the failure, an identifier for the job that was not executed, and so on.

The example of FIG. 6 includes re-launching (606) the job. In the example of FIG. 6, re-launching (606) the job includes selecting (608) an alternative connected node that is actively coupled for data communications with an active I/O node. In the example of FIG. 6, selecting (608) an alternative connected node that is actively coupled for data communications with an active I/O node can be carried out, for example, though the use of a routing table that specifies one or more alternative connected nodes that may be used when connectivity fails between an I/O node and the connected node that is currently being used to route jobs to the I/O node. The one or more alternative connected nodes can be used to route jobs from a compute node to an I/O node, thereby enabling the compute node to avoid routing jobs over the failed connection between the connected node that is currently being used to route jobs and the I/O node connected to such a connected node.

In the example of FIG. 6, selecting (608) an alternative connected node that is actively coupled for data communications with an active I/O node may include selecting (610) a predetermined alternative connected node previously identified as being coupled for data communications through a point-to-point network to the block of compute nodes. In the example of FIG. 6, an alternative connected node may be predetermined in the sense that the existence and availability of the alternative connected node was known to the compute node before the compute node became aware of connectivity failure between an I/O node and the connected node that is currently being used to route jobs to the I/O node. The predetermined alternative connected node may be selected (610), for example, through the use of a routing table used by the compute node that identifies the predetermined alternative connected node as an alternative connected node to be used in the event of connectivity failure between an I/O node and the connected node currently being used by a compute node.

In the example of FIG. 6, selecting (608) an alternative connected node that is actively coupled for data communications with an active I/O node may include identifying (612) another connected node that is coupled for data communications through a point-to-point network to the block of compute nodes. Identifying (612) another connected node that is coupled for data communications through a point-to-point network to the block of compute nodes may be carried out, for example, by receiving an identifier of an alternative connected node as part of the failure event received by the compute node from the supporting I/O node. Identifying (612) another connected node that is coupled for data communications through a point-to-point network to the block of compute nodes may also be carried out through other discovery techniques such as, for example, requesting an identifier of a connected node that is accessible through a neighboring compute node of a particular compute node.

The example of FIG. 6 includes assigning (614) the alternative connected node as the connected node for the block of compute nodes running the re-launched job. In the example of FIG. 6, assigning (614) the alternative connected node as the connected node for the block of compute nodes running the re-launched job can be carried out by designating the alternative connected node as the connected node through which a particular compute node will route all jobs.

Figure 7:
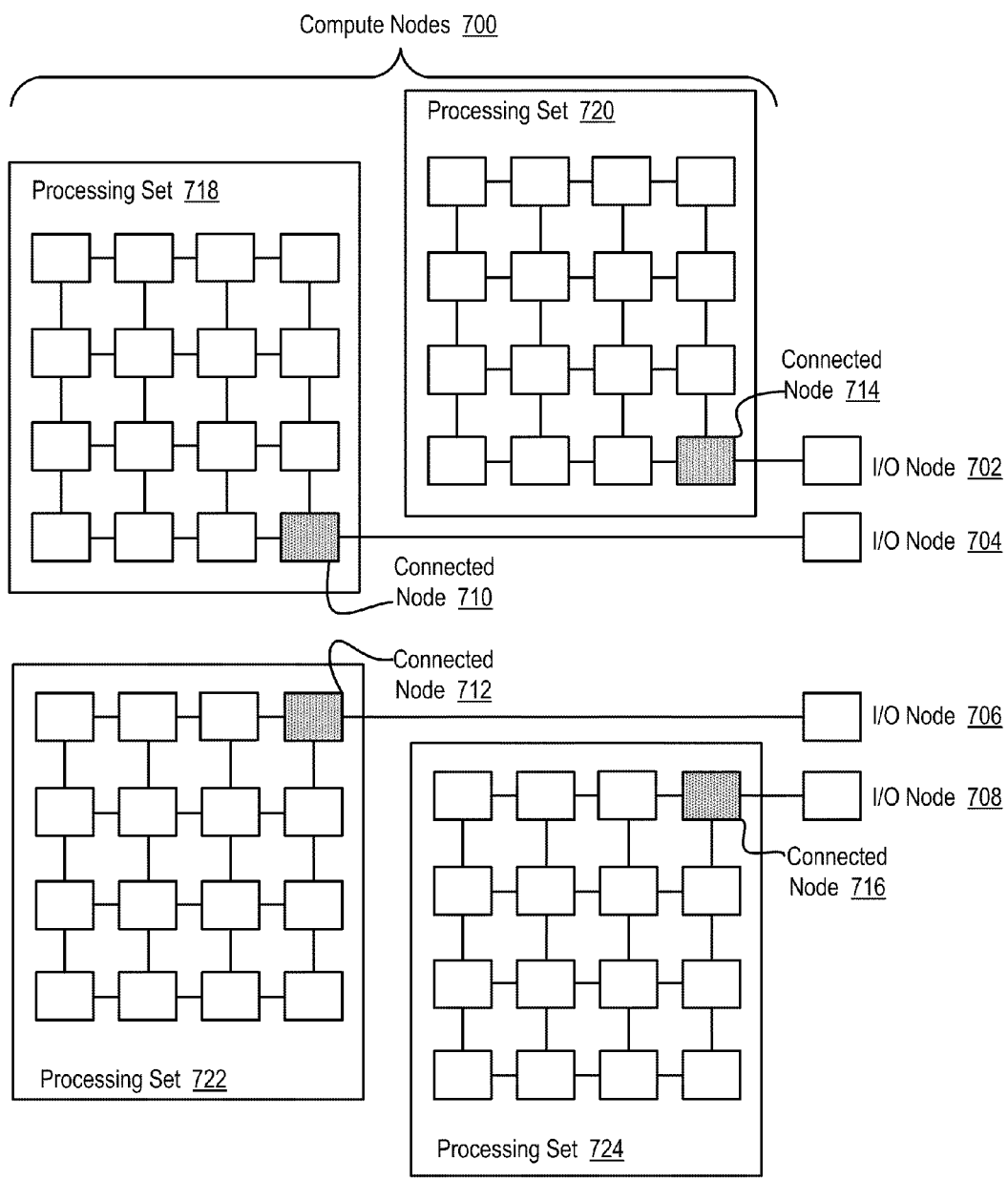
FIG. 7 sets forth a block diagram of a system for dynamically reassigning a connected node to a block of compute nodes for re-launching a failed job according to embodiments of the present invention.

For further explanation, FIG. 7 sets forth a block diagram of a system for dynamically reassigning a connected node to a block of compute nodes for re-launching a failed job according to embodiments of the present invention. The system of FIG. 7 includes a plurality of compute nodes (700) organized into processing sets (718, 720, 722, 724). Each processing set (718, 720, 722, 724) includes a connected node (710, 712, 714, 716). Each connected node (710, 712, 714, 716) provides connectivity between the compute nodes in its processing set (718, 720, 722, 724) and an I/O node (702, 704, 706, 708). Connectivity between the compute nodes in a particular connected node's (710, 712, 714, 716) processing set (718, 720, 722, 724) and an I/O node (702, 704, 706, 708) may be established because the connected nodes (710, 712, 714, 716) are coupled for data communications with an I/O node (702, 704, 706, 708) and because the connected nodes (710, 712, 714, 716) are also coupled for data communications with compute nodes in a connected node's (710, 712, 714, 716) processing set (718, 720, 722, 724).

For example, a particular connected node (710) can provide connectivity between the compute nodes in its processing set (718) and an I/O node (704) because the particular connected node (710) is coupled for data communications with the I/O node (704) and also coupled for data communications with compute nodes in the particular connected node's (710) processing set (718). The particular connected node (710) may be coupled for data communications with the I/O node (704), for example, via an Ethernet network. The particular connected node (710) may be may be coupled for data communications with the compute nodes in the particular connected node's (710) processing set (718), for example, via a Point-To-Point network as described above. In such an example, the particular connected node (710) may be used to enable data communications between the compute nodes in the particular connected node's (710) processing set (718) and the I/O node (704) by routing data communications between the compute nodes in the particular connected node's (710) processing set (718) and the I/O node (704).

Figure 8:
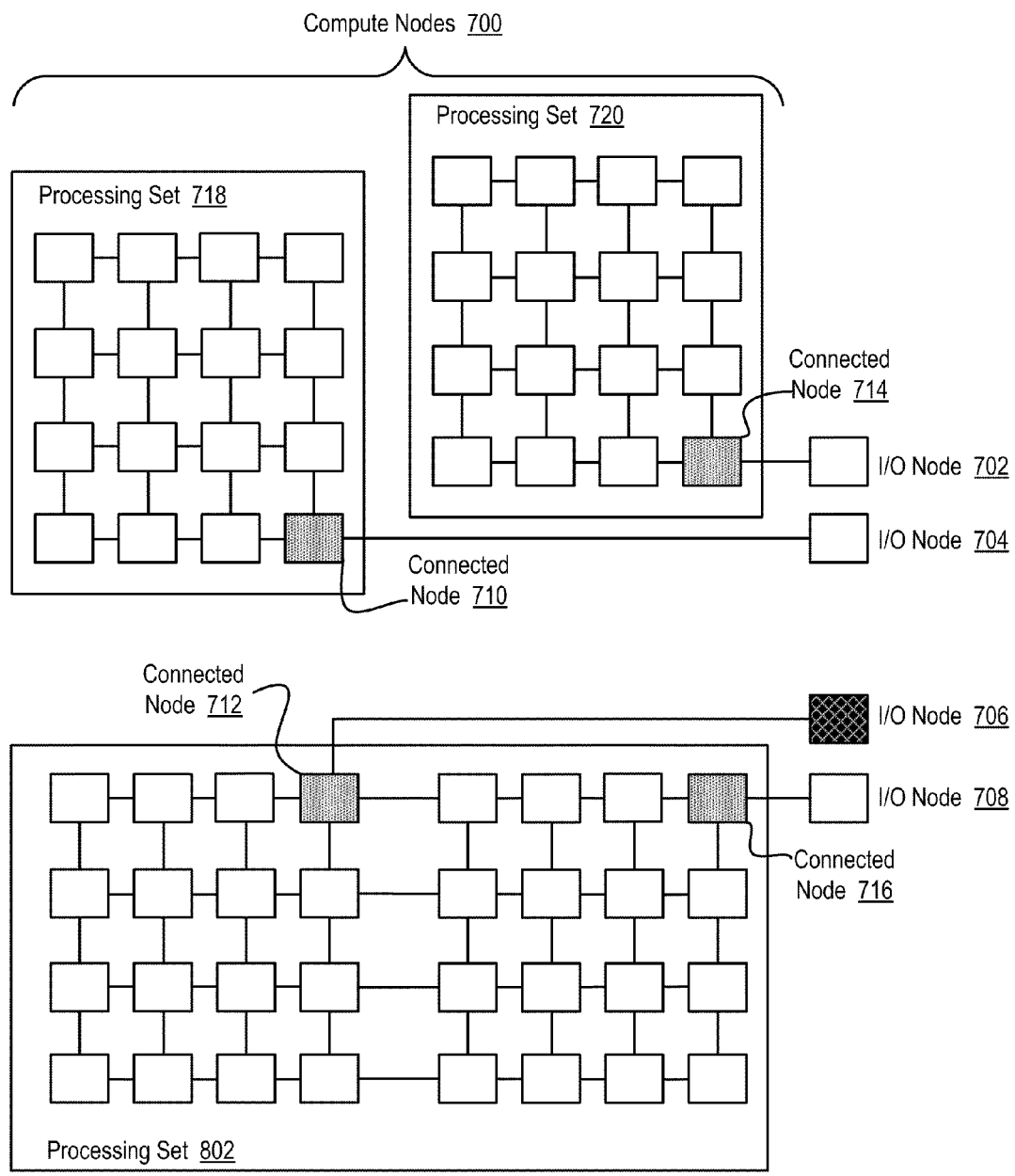
FIG. 8 sets forth a block diagram of a system for dynamically reassigning a connected node to a block of compute nodes for re-launching a failed job according to embodiments of the present invention.

For further explanation, FIG. 8 sets forth a block diagram of a system for dynamically reassigning a connected node (710, 712, 714, 716) to a block of compute nodes (700) for re-launching a failed job according to embodiments of the present invention. The system of FIG. 8 includes a plurality of compute nodes (700), connected nodes (710, 712, 714, 716), and I/O nodes (702, 704, 706, 708) as described above with reference to FIG. 7. In the example of FIG. 8, however, one I/O Node (706) has failed. FIG. 8 therefore represents the state of the system for dynamically reassigning a connected node (710, 712, 714, 716) to a block of compute nodes (700) for re-launching a failed job described in FIG. 7 after a particular connected node (716) has been reassigned. Because the I/O node (706) has failed, connectivity between the failed I/O node (706) and the connected node (712) that is coupled for data communications with the failed I/O node (706) has also failed. In accordance with embodiments of the present invention, FIG. 8 illustrates a system in which a connected node (716) has been dynamically reassigned to a block of compute nodes such that a job that failed because of the connectivity failure can be re-launched. In particular, the connected node (716) has been dynamically reassigned to a block of compute nodes that includes all compute nodes that were formerly included in the processing set (722 of FIG. 7) that was serviced by the failed I/O node (706). The connected node (716) therefore can be used to provide data communications between all nodes in a new processing set (802) and the I/O node (708) that is coupled for data communications with the connected node (716).

Exemplary embodiments of the present invention are described largely in the context of a fully functional computer system for dynamically reassigning a connected node to a block of compute nodes for re-launching a failed job. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

The invention claimed is:

1. A method of dynamically reassigning a connected node to a block of compute nodes for re-launching a failed job, the method comprising:
   identifying that a job failed to execute on the block of compute nodes because connectivity failed between a compute node assigned as at least one of the connected nodes for the block of compute nodes and its supporting I/O node; and
   re-launching the job, including:
   selecting an alternative connected node that is actively coupled for data communications with an active I/O node; and
   assigning the alternative connected node as the connected node for the block of compute nodes running the re-launched job.

2. The method of claim 1 wherein connectivity failed between the compute node assigned as at least one of the connected nodes for the block of compute nodes and its supporting I/O node because the I/O node failed.

3. The method of claim 1 wherein connectivity failed between the compute node assigned as at least one of the connected nodes for the block of compute nodes and its supporting I/O node because a link between the compute node assigned as at least one of the connected nodes for the block of compute nodes and the I/O node failed.

4. The method of claim 1 wherein selecting an alternative connected node that is actively coupled for data communications with an active I/O node further comprises selecting a predetermined alternative connected node previously identified as being coupled for data communications through a point-to-point network to the block of compute nodes.

5. The method of claim 1 wherein selecting an alternative connected node that is actively coupled for data communications with an active I/O node further comprises identifying another connected node that is coupled for data communications through a point-to-point network to the block of compute nodes.

6. The method of claim 1 wherein identifying that a job failed to execute on the block of compute nodes because connectivity failed between a compute node assigned as at least one of the connected nodes for the block of compute nodes and its supporting I/O node further comprises receiving a failure event from the supporting I/O node.

7. Apparatus for dynamically reassigning a connected node to a block of compute nodes for re-launching a failed job, the apparatus comprising a computer processor, a computer memory operatively coupled to the computer processor, the computer memory having stored on it computer program instructions that, when executed by the computer processor, cause the apparatus to carry out the steps of:
  identifying that a job failed to execute on the block of compute nodes because connectivity failed between a compute node assigned as at least one of the connected nodes for the block of compute nodes and its supporting I/O node; and
  re-launching the job, including:
  selecting an alternative connected node that is actively coupled for data communications with an active I/O node; and
  assigning the alternative connected node as the connected node for the block of compute nodes running the re-launched job.

8. The apparatus of claim 7 wherein connectivity failed between the compute node assigned as at least one of the connected nodes for the block of compute nodes and its supporting I/O node because the I/O node failed.

9. The apparatus of claim 7 wherein connectivity failed between the compute node assigned as at least one of the connected nodes for the block of compute nodes and its supporting I/O node because a link between the compute node assigned as at least one of the connected nodes for the block of compute nodes and the I/O node failed.

10. The apparatus of claim 7 wherein selecting an alternative connected node that is actively coupled for data communications with an active I/O node further comprises selecting a predetermined alternative connected node previously identified as being coupled for data communications through a point-to-point network to the block of compute nodes.

11. The apparatus of claim 7 wherein selecting an alternative connected node that is actively coupled for data communications with an active I/O node further comprises identifying another connected node that is coupled for data communications through a point-to-point network to the block of compute nodes.

12. The apparatus of claim 7 wherein identifying that a job failed to execute on the block of compute nodes because connectivity failed between a compute node assigned as at least one of the connected nodes for the block of compute nodes and its supporting I/O node further comprises receiving a failure event from the supporting I/O node.

13. A computer program product for dynamically reassigning a connected node to a block of compute nodes for re-launching a failed job, the computer program product stored on a non-transitory computer readable storage medium, the computer program product comprising computer program instructions that, when executed, cause a computer to carry out the steps of:
  identifying that a job failed to execute on the block of compute nodes because connectivity failed between a compute node assigned as at least one of the connected nodes for the block of compute nodes and its supporting I/O node; and
  re-launching the job, including:
  selecting an alternative connected node that is actively coupled for data communications with an active I/O node; and
  assigning the alternative connected node as the connected node for the block of compute nodes running the re-launched job.

14. The computer program product of claim 13 wherein connectivity failed between the compute node assigned as at least one of the connected nodes for the block of compute nodes and its supporting I/O node because the I/O node failed.

15. The computer program product of claim 13 wherein connectivity failed between the compute node assigned as at least one of the connected nodes for the block of compute nodes and its supporting I/O node because a link between the compute node assigned as at least one of the connected nodes for the block of compute nodes and the I/O node failed.

16. The computer program product of claim 13 wherein selecting an alternative connected node that is actively coupled for data communications with an active I/O node further comprises selecting a predetermined alternative connected node previously identified as being coupled for data communications through a point-to-point network to the block of compute nodes.

17. The computer program product of claim 13 wherein selecting an alternative connected node that is actively coupled for data communications with an active I/O node further comprises identifying another connected node that is coupled for data communications through a point-to-point network to the block of compute nodes.

18. The computer program product of claim 13 wherein identifying that a job failed to execute on the block of compute nodes because connectivity failed between a compute node assigned as at least one of the connected nodes for the block of compute nodes and its supporting I/O node further comprises receiving a failure event from the supporting I/O node.

* * * * *